United States Patent [19]

Yoshida

[11] Patent Number: 5,315,467
[45] Date of Patent: May 24, 1994

[54] HEAD ACTUATOR PIVOTING AROUND STATIONARY SHAFT AND DISH HAVING SUCH HEAD ACTUATOR

[75] Inventor: Kobun Yoshida, Sayama, Japan

[73] Assignee: Teac Corporation, Tokyo, Japan

[21] Appl. No.: 904,885

[22] Filed: Jun. 25, 1992

Related U.S. Application Data

[63] Continuation of Ser. No. 610,807, Nov. 8, 1990, abandoned.

[30] Foreign Application Priority Data

Nov. 13, 1989 [JP] Japan ............... 1-131818[U]

[51] Int. Cl.$^5$ ............................................. G11B 21/02
[52] U.S. Cl. ................................. 360/106; 360/99.08
[58] Field of Search ............... 360/106, 99.08, 98.07, 360/99.04, 104; 384/543, 544, 545, 546, 547, 586, 587, 588, 589

[56] References Cited

U.S. PATENT DOCUMENTS

| | | | |
|---|---|---|---|
| 4,359,762 | 11/1982 | Stollorz | 360/133 |
| 4,544,972 | 10/1985 | Kogure et al. | 360/106 |
| 4,639,863 | 1/1987 | Harrison et al. | 360/106 |
| 4,717,977 | 1/1988 | Brown | 360/98.07 |
| 4,754,353 | 6/1988 | Levy | 360/98.07 |
| 4,797,762 | 1/1989 | Levy et al. | 360/98.07 |
| 4,819,110 | 4/1989 | Funai et al. | 360/106 |
| 4,835,643 | 5/1989 | Schulze | 360/106 |
| 4,835,644 | 5/1989 | Schulze | 360/106 |
| 4,941,062 | 7/1990 | Yoshioka | 360/106 |
| 4,974,103 | 11/1990 | Iftikar et al. | 360/99.08 |
| 4,985,652 | 1/1991 | Oudet et al. | 360/106 |
| 5,016,131 | 5/1991 | Riggle et al. | 360/106 |
| 5,025,336 | 6/1991 | Morehouse et al. | 360/104 |

FOREIGN PATENT DOCUMENTS

| | | | |
|---|---|---|---|
| 54-136309 | 10/1979 | Japan | 360/98.07 |
| 63-142574 | 6/1988 | Japan | 360/104 |
| 1641168 | 1/1989 | Japan | 360/99.08 |
| 1162287 | 6/1989 | Japan | 360/104 |
| 1179284 | 7/1989 | Japan | 360/104 |
| 8809551 | 12/1988 | PCT Int'l Appl. | 360/106 |
| 8809552 | 12/1988 | PCT Int'l Appl. | 360/98.01 |
| 151139 | 2/1991 | Taiwan . | |

Primary Examiner—Stuart S. Levy
Assistant Examiner—Kevin M. Watkins
Attorney, Agent, or Firm—Michael N. Meller

[57] ABSTRACT

A head actuator has a shaft fixed on a base and a head supporting member, to which a head is attached, pivotably supported around the shaft. Because the shaft does not pivot with the head supporting member, it is not necessary to provide a member for supporting the pivoting shaft from both sides thereof, so that the head actuator can be made thin. Accordingly the disk storage having the head actuator can also be made thin.

16 Claims, 5 Drawing Sheets

HEAD ACTUATOR PIVOTING AROUND STATIONARY SHAFT AND DISH HAVING SUCH HEAD ACTUATOR

This application is a continuation of application Ser. No. 610,807, filed Nov. 8, 1990, now abandoned.

BACKGROUND OF THE INVENTION

The present invention relates generally to head actuators and to disk storage devices having head actuators, and more particularly to a rotary head actuator pivotable around a shaft and a disk storage device having such a head actuator.

Among magnetic disk storages, hard disk storages have been used as memory means for computers. Hard disks have been more improved than so-called floppy disks in TPI (track per inch) and BPI (bit per inch) so that the hard disks can be recorded with high density. The hard disk is fixed in a sealed housing to prevent dust from the outside attaching itself thereto so that it can be recorded with high density. In such a hard disk storage, a rotary head actuator is usually used for it.

A rotary mechanism of a conventional head actuator comprises, as shown in FIG.1, a head supporting member 14 to which a head arm having magnetic heads at the top thereof (not shown) is attached, a shaft 15, bearing beds 16 and a yoke 17. The head supporting member 14 is coupled to the shaft 15 so that they are rotatable together. The shaft 15 is supported by the bearing beds 16 via the bearings 19, and the bearing beds 16 are fixed on the case 18. In addition, the yoke 17, which is used for a voice coil motor, is fixed on the case 18 apart from the head supporting member 14, the shaft 15 and the bearing beds 16. The yoke 17 is inserted into the case 18 from the side surface or the upper surface of the storage so as to be attached to the case 18.

However the conventional head actuator has the following disadvantages.

1. It is difficult to make the device thin because the bearing beds 16 which support the rotating shaft 15 must be provided in the direction of the thickness of the case 18.

2. Since the yoke 17 is made individually from other parts so as to be attached to the case 18, it is necessary to wait for a performance test of the voice coil motor until the actuator is completely assembled in the case 18, which is troublesome.

3. It is difficult to insert the yoke 17 into the case 18 from the side of the storage, and on the other hand, at least a screwing process will take longer if it is inserted from the upper surface thereof.

4. It is difficult to assemble the actuator in the case 18, thus the process for assembling it will take longer.

SUMMARY OF THE INVENTION

Accordingly, it is a general object of the present invention to provide a novel and useful disk storage in which the disadvantages described above are eliminated.

Another object of the present invention is to provide a head actuator which can make a disk storage device thin, and a disk storage device having such a head actuator.

Still another object of the present invention is to provide a head actuator which can be assembled easily, and a disk storage device having such a head actuator.

The more specific object of the present invention is to provide a head actuator which comprises a shaft approximately vertically fixed on a base, a head supporting member pivotably supported around the stationary shaft, and a head attached to the head supporting member.

Further more specific object of the present invention is to provide a disk storage device which comprises a head actuator which comprises a stationary shaft, a head supporting member pivotably supported around the stationary shaft, a head attached to the head supporting member, a disk on which information is recorded and/or from which information is reproduced by the head, a housing, acommodating the head actuator and the disk therein, which has a first surface and a second surface opposite to the first surface, the stationary shaft being fixed approximately vertical to the first surface and the second surface, and a span of the shaft being approximately equal to a distance between the first surface and the second surface.

According to the present invention, it is not necessary to provide bearing beds for supporting a shaft from an upper side and a lower side since the shaft is fixed while only a head supporting member pivots around the shaft. Therefore the head actuator can be actuator by eliminating the bearing beds. The external circuit and external driving device, which contain the current supply source, (first driving device) are connected to the information processor and the controller (second driving device) via connector 42e as shown in FIG. 7.

Other objects and further features of the present invention will become apparent from the following detailed description when read in conjunction with the accompanying drawings.

DESCRIPTION OF PREFERRED EMBODIMENTS

Figure 1:
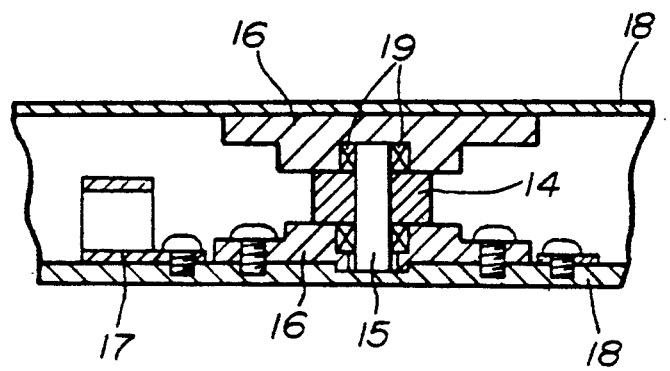
FIG.1 is a main cross-sectional view of a head actuator of a conventional magnetic disk storage.

A description will now be given of a first embodiment according to the present invention with reference to FIGS.2 through 4.

A magnetic disk storage of the embodiment according to the present invention is a hard disk storage which has an actuator 4 in a case 5, which actuator comprises magnetic heads 3, a head supporting member 4a having the heads 3 at the top thereof, and a voice coil motor 13. As shown in FIG.2, a magnetic disk 1 is rotated by a spindle motor 2, and information is recorded thereon and/or therefrom by the heads 3. The heads 3 are located at the top of the head supporting member 4a so as to hold the disk 1, as shown in FIG.3. The head actuator 4 is a rotary type actuator so that it moves the head 3 in an approximately radial direction of the disk 1 (direction A). The motor 2 comprises a rotor and a housing. The disk 1 is fixed around the rotor. And a code is pulled out into the case from the side of the housing so as to be connected with the flexible printed circuit board 6a. The flexible printed circuit board 6a is connected with an external device via a connector 7. On the other hand, the flexible printed circuit board 6a and the actuator 4 are connected with each other via a wire 6c. Therefore the information recorded and/or reproduced by the head 3 and electricity to be supplied to a driving coil 12 of the voice coil motor 13 are supplied and/or transmitted to the actuator 4 via the connector 7, the flexible printed circuit board 6a, and the wire 6c.

Figure 3:
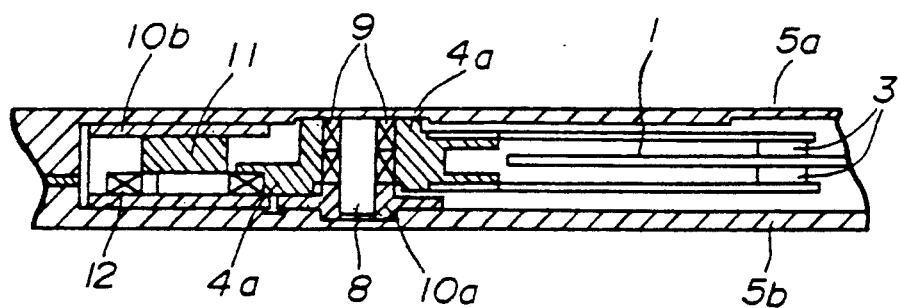
FIG.3 is a cross-sectional view taken along line I—I shown in FIG.2.

As shown in FIG.3, the case 5 comprises an upper case 5a and a lower case 5b. The head supporting member 4a is pivotably supported around the shaft 8 via the rolling bearings 9. In this embodiment, although two rolling bearings 9 are used, the number of the bearings are not limited to two. The shaft 8 is held between the upper case 5a and the lower case 5b, and is fixed longitudinally by the fixed plate 10a. Therefore, only the head supporting member 4a rotates whereas the shaft 8 is fixed. Accordingly, it is not necessary to provide bearing beds between the upper case 5a and the lower case 5b, which bearing beds support the shaft from the upper side and the lower side as in the conventional head actuator, which means the head actuator can be made thinner. Consequently, the magnetic disk storage can be made thinner by the thickness of the conventional bearing beds. A member which is located between the head supporting member 4a and the shaft 8 may be any bearings instead of the rolling bearings 9.

The voice coil motor 13 comprises the fixed plate 10a, a yoke 10b, a permanent magnet 11 and the driving coil 12. In this embodiment, the fixed plate 10a serves also as a yoke which is to be mounted on the lower case 5b so as to be opposite to the yoke 10b. Therefore, the head actuator 4 as a whole can be provided in the case 5 without attaching a yoke to the case individually. In addition, it is not necessary to assemble the actuator 4 in the case 5 so that the time required for an assembling process can be reduced. Moreover, the troublesome work required to attach the yoke individually to the case 5 can be avoided. However, whether or not the fixed plate 10a serves as a yoke is a matter of choice, and a yoke opposite to the yoke 10b apart from the fixed plate 10a may be provided.

The permanent magnet 11 is fixed on the yoke 10b so as to be opposite to the fixed plate 10a. The driving coil 12 is located between the permanent magnet 11 and the fixed plate 10a. When the driving coil 12 is energized by the wire 6c, the head actuator 4 is rotated in the direction A on the basis of Fleming's rule. Hereupon, the permanent magnet 11 may be fixed on the fixed plate 10a, whereas the driving coil 12 may be located between the permanent magnet 11 and the yoke 10b.

Figure 4:
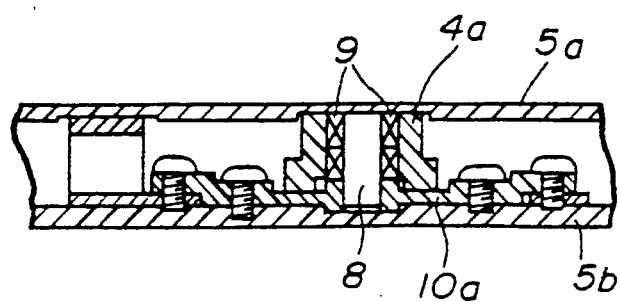
FIG.4 is a cross-sectional view taken along line II—II shown in FIG.2.
Figure 2:
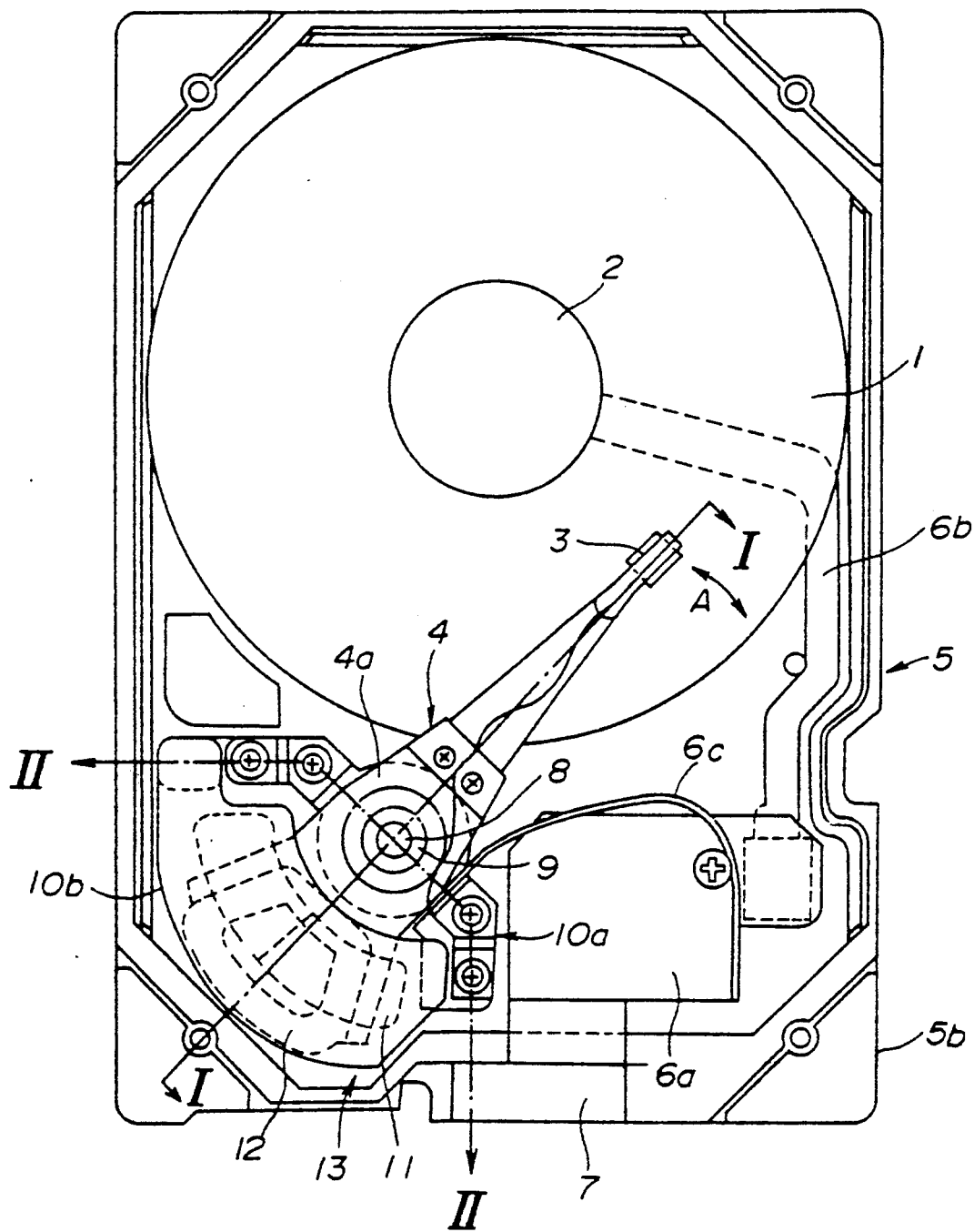
FIG.2 is a plane view of a first embodiment of a magnetic disk storage according to the present invention.

Incidentally the flexible printed circuit board 6a and the fixed plate 10a are screwed on the lower case 5b, as shown in FIG.2 and FIG.4.

Figure 5:
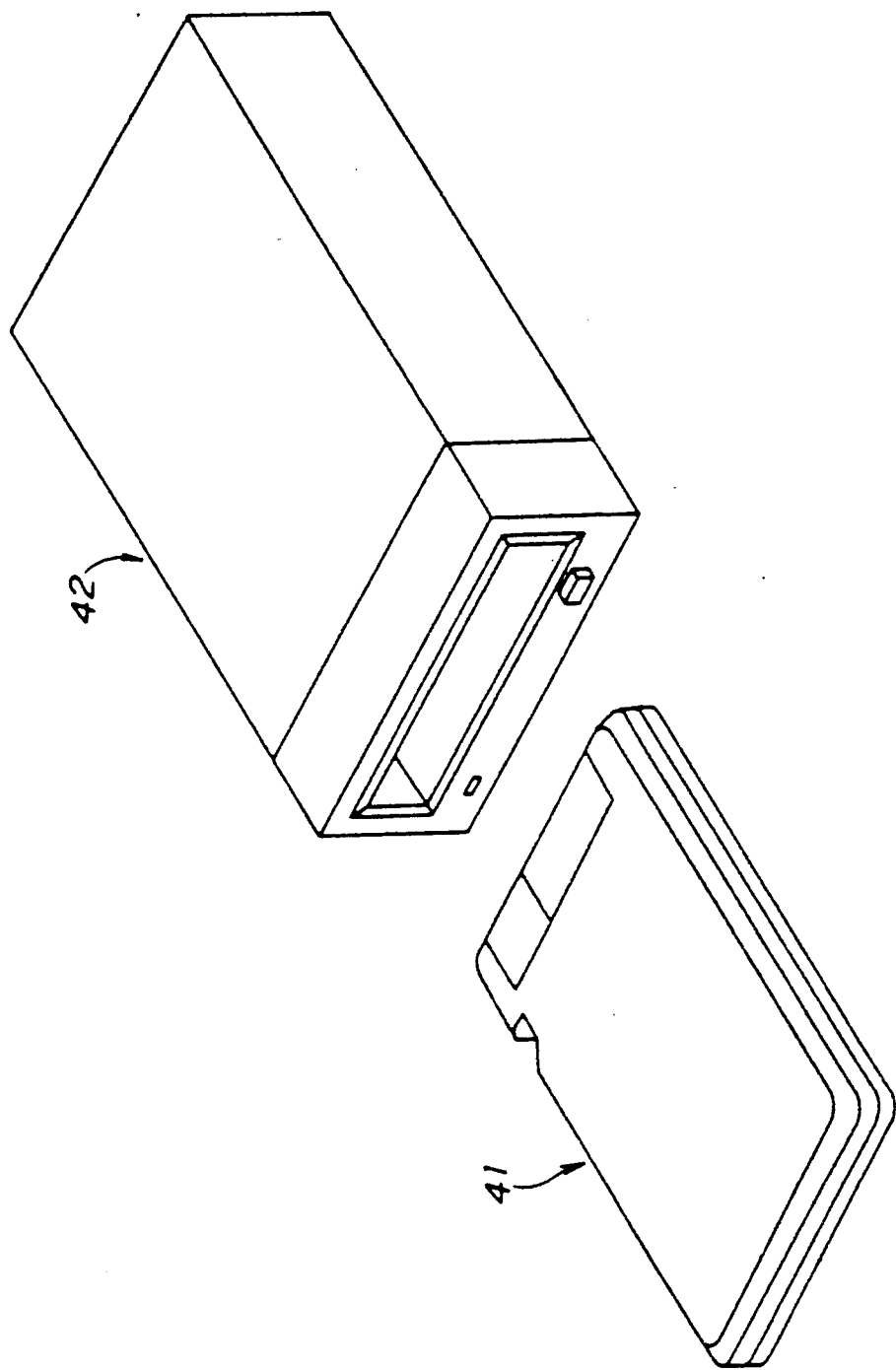
FIG.5 is a perspective view of of a second embodiment of a magnetic disk storage according to the present invention.
Figure 6:
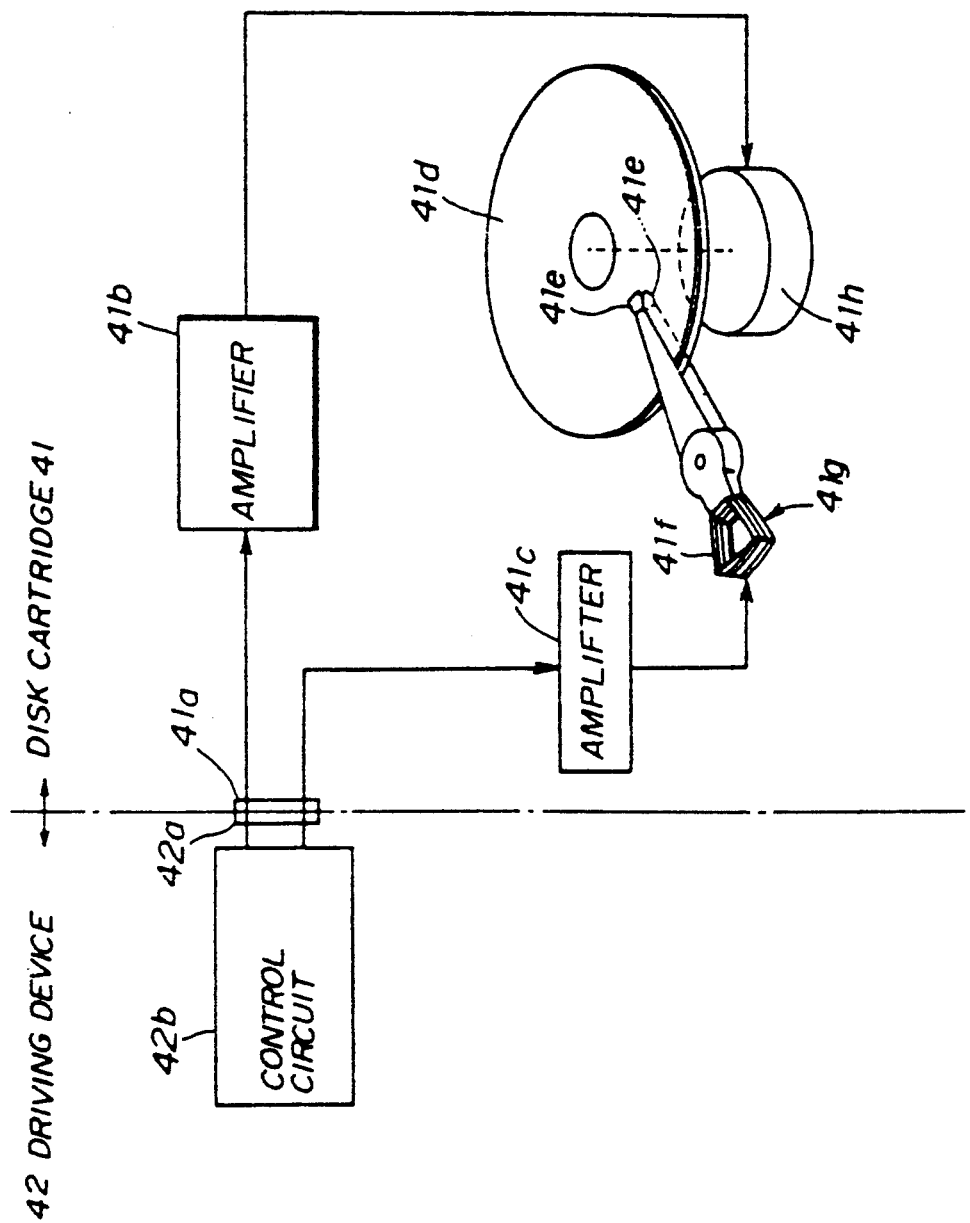
FIG.6 is a system block diagram showing a general circuit arrangement which drives and controls an actuator and a spindle motor in a disk cartridge.
Figure 7:
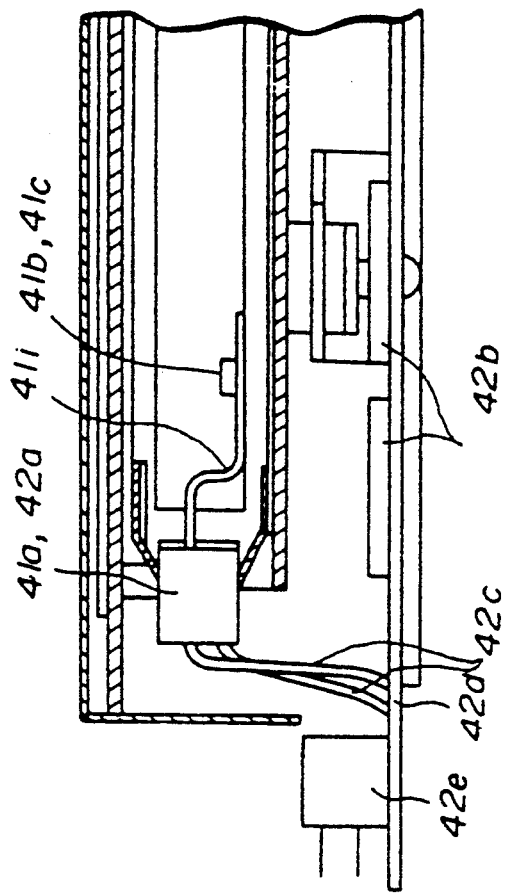
FIG.7 is a cross-sectional view showing an electrical connection of connectors, a control circuit and amplifiers.

FIG.5 shows a magnetic disk storage comprising a disk cartridge 41 and a driving device 42. The term "a disk cartridge", as used herein, means an apparatus which comprises at least a disk and a head in a sealed case, but has no current supply source to drive them and has no controller to control them. The term "a driving device", as used herein, means an apparatus which has the current supply source and/or the controller. The disk cartridge 41 can be easily connected to and disconnected from the driving device 42. Therefore, the disk cartridge 41 may be considered as being an easily exchangable hard disk. The disk cartridge 41 has an arrangement similar to that shown in FIG.1. The disk cartridge 41 is required to be made thin in order to carry it easily. Accordingly, the present invention is available for the magnetic disk storage having the disk cartridge 41 shown in FIG.5. The disk cartridge 41 has a connector 41a which corresponds to the connector 7 in FIG.1. On the other hand, the driving device 42 has a connector 42a to be connected with the connector 41a. The driving device 42 has a current supply source (not shown). The disk cartridge 41 further comprises a disk 41d corresponding to the disk 1 in FIG.1, an actuator 41g corresponding to the actuator 4, magnetic heads 41e corresponding to the heads 3, a spindle motor 41h corresponding to the spindle motor 2. As shown in FIG.6, when the connectors 41a and 42a are connected to each other, the control circuit 42b controls electricity for driving a driving coil 41f and the spindle motor 41h via amplifiers 41b and 41c. The amplifiers 41b and 41c are mounted on a flexible printed circuit board 41i corresponding to the flexible printed circuit board 6a in FIG.1, and thus via the flexible printed circuit board 41i the amplifiers 41b and 41c are connected to the connector 41a. The amplifiers 41b and 41c may be made as IC boards so as to be mounted on the flexible printed circuit board 41i. The control circuit 42b may be further controlled by an external circuit. In this case, as shown FIG.7, the driving device 42 has a connector 42e for connecting the driving device to the external device. The control circuit 42b is connected to the connector 42a via the printed circuit board 42d and lead wires 42c. Therefore when the disk cartridge 41 is connected to the driving device 42 via the connectors 41a and 42a, the amplifiers 41b and 41c are connected to the control circuit 42b. The control circuit 42b may be connected to the external device so as to be controlled via the printed circuit 42d and the connector 42e. The electricity, information recorded and/or reproduced by the head 41e, and control signals for controlling the driving of the driving device 41f and the spindle motor 41h are transmitted via the connectors 41a and 42a between the disk cartridge 41 and the driving device 42. The driving device 42 may control the driving of the driving coil 41f and the spindle motor 41h with or without the external device. Also the driving device may further comprise an information processor for processing the information recorded and/or reproduced by the head 41e.

The present invention can be applied, needless to say, to disk storage devices having head actuator, such as optical disk storages, photomagnetic disk storages.

Further, the present invention is not limited to these preferred embodiments, but various variations and modifications may be made without departing from the scope of the present invention.

What is claimed is:

1. A magnetic disk storage adapted to be interchangeably connected to a driving device which provides a means for coupling said magnetic disk storage to a computer, said magnetic disk storage comprising:
   a single fixed plate;
   a head actuator provided on said fixed plate and comprising a stationary shaft having first and second ends, a head supporting member pivotably supported around said stationary shaft, and a head attached to said head supporting member, said stationary shaft of said head actuator being positionally fixed in a longitudinal direction of said stationary shaft by said fixed plate which supports only the first end of said stationary shaft;

a disk on which information is recorded and/or from which information is reproduced by said head; and a housing, accommodating said head actuator and said disk therein, which has a first surface and a second surface opposite to said first surface, said actuator being fixed on said first surface in said housing via said fixed plate, said fixed plate being a member different from said housing, one end of said stationary shaft extending substantially vertically on said first surface of said housing via said fixed plate so that a span of said stationary shaft is substantially equal to a distance between said first surface and said second surface, said stationary shaft being held between said first and second surfaces of said housing, said second end of said stationary shaft directly engaging but not secured to said second surface of said housing, said second end of said stationary shaft directly engaging said second surface of said housing without an intervening fixed plate.

2. A magnetic disk storage according to claim 1, wherein said head is a magnetic head and said head actuator further comprises a voice coil motor which includes:

a first yoke and a second yoke which is supported on said first yoke and faces said first yoke, a permanent magnet attached to one of said first and second yokes so as to face the other of said first and second yokes, and a driving coil, coupled to said head supporting member, and rotatable between said permanent magnet and said other of said first and second yokes in response to a rotating of said head supporting member, said first yoke having a supporting part with which said stationary shaft is engaged.

3. The magnetic disk storage as claimed in claim 2, wherein said fixed plate and said first yoke are the same member.

4. A disk storage device according to claim 1, wherein said disk storage device further comprises:

a disk cartridge; and a driving device, wherein said disk cartridge comprises said head actuator, said disk and said housing, said head being a magnetic head, and said disk being a magnetic disk, and wherein said driving device has a current supply source which supplies electricity to said disk cartridge when said disk cartridge is electrically connected with said driving device.

5. A disk storage device according to claim 4, wherein said driving device has an information processor which receives and/or transmits the information.

6. A disk storage device according to claim 5, wherein said driving device has a controller which controls the driving of the head and said disk.

7. A disk storage according to claim 6, wherein said driving device further comprises:

a first driving device; and a second driving device, and wherein the first driving device has the current supply source, and the second driving device has the information processor and the controller.

8. The magnetic disk storage as claimed in claim 1, which further comprising a rolling bearing provided between said stationary shaft and said head supporting member.

9. The magnetic disk storage as claimed in claim 1, wherein said second surface of said housing supports said second end of said stationary shaft.

10. The magnetic disk storage as claimed in claim 1, wherein said head supporting member has a top surface, and said second surface of said housing supports the top surface of said supporting member and the second end of said stationary shaft.

11. A head actuator adapted to be fixed in a housing, comprising:

said housing has a first surface and a second surface opposite to said first surface, a single fixed plate via which said head actuator is fixed in said housing, said fixed plate being a member different from said housing;

a stationary shaft having first and second ends;

a head supporting member pivotably supported around said stationary shaft, said head supporting member having substantially the same height as said stationary shaft; and a head attached to said head supporting member, said stationary shaft of said head supporting member being positionally fixed in a longitudinal direction of said stationary shaft by said fixed plate which supports only said first end of said stationary shaft, said stationary shaft being held between said first and second surfaces of said housing, said second end of said stationary shaft directly engaging but not secured to said second surface of said housing, said second end of said stationary shaft directly engaging said second surface of said housing without an intervening fixed plate.

12. A head actuator according to claim 11, wherein said head is a magnetic head, and said head actuator further comprises a voice coil motor which includes:

a first yoke and a second yoke which is supported on said first yoke and faces said first yoke, a permanent magnet attached to one of said first and second yokes so as to face the other of said first and second yokes, and a driving coil, coupled to said head supporting member, and rotatable between said permanent magnet and said other of said first and second yokes in response to a rotation of said head supporting member, said first yoke having a supporting part with which said stationary shaft is engaged.

13. The head actuator as claimed in claim 12, wherein said fixed plate and said first yoke are the same member.

14. The head actuator as claimed in claim 11, which further comprises a rolling bearing provided between said stationary shaft and said head supporting member.

15. The head actuator as claimed in claim 11, wherein said second end of said stationary shaft is supported by said second surface of said housing.

16. The head actuator as claimed in claim 11, wherein said head supporting member has a top surface, and said top surface of said head supporting member and said second end of said stationary shaft are supported by said second surface of said housing.

* * * * *